US009555482B2

(12) United States Patent
Saito et al.

(10) Patent No.: US 9,555,482 B2
(45) Date of Patent: Jan. 31, 2017

(54) AIR CONTROL DEVICE AND AIR CONTROL METHOD

(71) Applicants: Fuji Jukogyo Kabushiki Kaisha, Tokyo (JP); Amussis Inc., Tochigi (JP)

(72) Inventors: Manabu Saito, Tokyo (JP); Tatsuo Nakahata, Tokyo (JP); Masao Watanabe, Tokyo (JP); Tsuneari Mimori, Tochigi (JP)

(73) Assignees: FUJI JUKOGYO KABUSHIKI KAISHA, Tokyo (JP); AMUSSIS INC., Tochigi (JP)

( * ) Notice: Subject to any disclaimer, the term of this patent is extended or adjusted under 35 U.S.C. 154(b) by 585 days.

(21) Appl. No.: 14/020,109

(22) Filed: Sep. 6, 2013

(65) Prior Publication Data

US 2014/0069677 A1 Mar. 13, 2014

(30) Foreign Application Priority Data

Sep. 10, 2012 (JP) ................. 2012-198990

(51) Int. Cl.
*B23B 39/10* (2006.01)
*B23Q 5/26* (2006.01)
*F15B 11/06* (2006.01)

(52) U.S. Cl.
CPC ............. *B23B 39/10* (2013.01); *B23Q 5/263* (2013.01); *F15B 11/06* (2013.01); *B23B 2270/027* (2013.01); *F15B 2211/3057* (2013.01); *F15B 2211/329* (2013.01); *F15B 2211/355* (2013.01); *F15B 2211/625* (2013.01); *F15B 2211/635* (2013.01); *F15B 2211/7725* (2013.01); *F15B 2211/8855* (2013.01)

(58) Field of Classification Search
CPC ................. B23B 39/10; B23Q 5/261
USPC .... 173/218, 141, 152, 159, 161; 408/10, 11, 408/14, 130, 1 R
See application file for complete search history.

(56) References Cited

U.S. PATENT DOCUMENTS

| 3,212,372 A | 10/1965 | Knox, Jr. |
| 3,227,049 A | 1/1966 | Favrot |
| 3,802,792 A | 4/1974 | Quackenbush |
| 4,064,585 A | 12/1977 | Loos |
| 4,123,188 A | 10/1978 | Deremo et al. |
| 4,329,092 A * | 5/1982 | Ponitzsch ............... B23B 45/04 408/10 |

(Continued)

FOREIGN PATENT DOCUMENTS

| JP | S61-191810 U | 11/1986 |
| JP | 2010-228049 A | 10/2010 |

OTHER PUBLICATIONS

Extended European Search Report, issued Nov. 28, 2013, in related European Application No. 13 18 2617.4.

(Continued)

*Primary Examiner* — Nathaniel Chukwurah
(74) *Attorney, Agent, or Firm* — Smith, Gambrell & Russell, LLP

(57) ABSTRACT

An air control device includes an air suction port, air discharge ports, and an air control system. The air suction port takes in air. The air discharge ports discharge the taken-in air. The air control system discharges the air through the air discharge ports alternately for respective preset times. An air control method includes: taking in air; and discharging the air alternately through air discharge ports for respective preset times.

14 Claims, 4 Drawing Sheets

(56) References Cited

U.S. PATENT DOCUMENTS

| | | | | |
|---|---|---|---|---|
| 4,752,161 | A | * | 6/1988 | Hill ......................... B23Q 5/06 408/127 |
| 5,222,844 | A | | 6/1993 | Maass et al. |
| 2004/0101376 | A1 | * | 5/2004 | Shemeta ................. B23Q 5/26 408/130 |
| 2010/0247254 | A1 | * | 9/2010 | Uchiuzo ................ B23B 45/04 408/57 |

OTHER PUBLICATIONS

European Office Action issued Jan. 29, 2015, in EP Patent Application No. 13 182 617.4 (6 pages in English).
Second European Office Action issued Oct. 8, 2015, in EP Patent Application No. 13 182 617.4 (6 pages in English).
First Japanese Office Action issued Jun. 14, 2016, in Japanese Patent Application No. 2012-198990 (6 pages in Japanese with English translation).

* cited by examiner

AIR CONTROL DEVICE AND AIR CONTROL METHOD

CROSS-REFERENCE TO RELATED APPLICATIONS

The present application claims priority from Japanese Patent Application No. 2012-198990, filed on Sep. 10, 2012, the entire contents of which are hereby incorporated by reference.

BACKGROUND OF THE INVENTION

1. Technical Field

The present invention relates to air control devices and an air control methods.

2. Related Art

A pneumatic drill driving device is known as a conventional hand tool (see Japanese Unexamined Patent Application Publication No. 2010-228049, for example). The pneumatic drill driving device is capable of applying a feed operation in a tool axis direction to a drill using air pressure. A drill driving device capable of this type of feed operation is also known as an air-feed drill unit. In implementing drilling work in use of a drill, it is difficult to discharge chips smoothly

SUMMARY OF THE INVENTION

An object of the present invention is therefore to provide an air control device and an air control method with which a drilled hole can be prevented from becoming clogged with chips.

An aspect of the present invention provides an air control device including: an air suction port, air discharge ports, and an air control system. The air suction port takes in air. The air discharge ports discharge the taken-in air. The air control system discharges the air through the air discharge ports alternately for respective preset times.

Another aspect of the present invention provides an air control method including the steps of taking in air, and discharging the air alternately through air discharge ports for respective preset times.

DETAILED DESCRIPTION

An air control device and an air control method according to an example of the present invention will be described below with reference to the attached drawings.

(Configuration and Functions)

Figure 1:
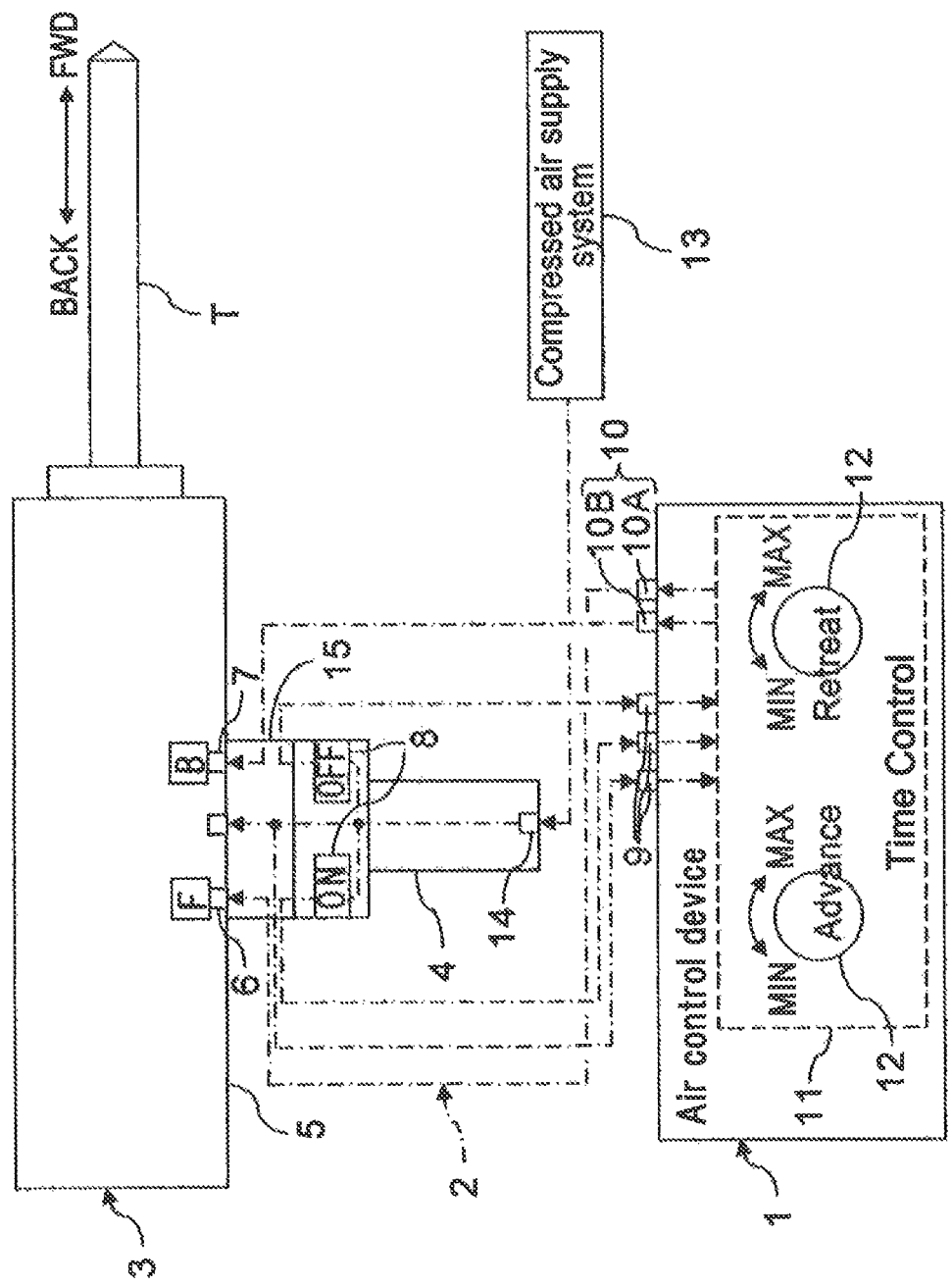
FIG. 1 is a schematic view showing a drill driving device connected to an air control device according to an example of the present invention is connected.

FIG. 1 is a schematic view showing a drill driving device connected to an air control device according to an example of the present invention.

An air control device 1 is connected to a drill driving device 3 via air flow passages 2. Dot-dash lines in FIG. 1 denote the air flow passages. The drill driving device 3 may be provided as a constituent element of the air control device 1.

The drill driving device 3 is formed by attaching a grip 4 to be gripped by a user to a tool driver 5. The tool driver 5 applies a rotation operation and a feed operation in a tool axis direction to a tool T such as a drill and an end mill while holding the tool T. The rotation operation and feed operation applied to the tool T are performed using compressed air as a main power source. Hence, the tool driver 5 is provided with a first air suction port 6 that supplies air for advancing the tool T advancing air to a pneumatic cylinder and a second air suction port 7 that supplies air for retracting the tool T to the pneumatic cylinder.

Further, auxiliary constituent components of the tool driver 5 and the drill driving device 3 may be provided with an air suction port required for air control undertaken with other aims, such as supplying cutting oil and controlling of a feed speed of the tool T.

ON and OFF switches 8 for controlling drill driving is provided in the vicinity of the grip 4 of the tool driver 5. In FIG. 1, the air flow passages are opened and closed by the ON and OFF switches 8.

The air control device 1 includes air suction ports 9 from which air is taken in, air discharge ports 10 which discharge the taken-in air, and an air control system 11.

Each of the air discharge ports 10 includes at least a first air discharge port 10A corresponding to a air flow passage 2 of the drill driving device 3 for advancing the tool and a second air discharge port 10B corresponding to another air flow passage 2 of the drill driving device 3 for retracting the tool. The first air discharge port 10A and the second air discharge port 10B of the air control device 1 are respectively coupled to the first air suction port 6 and the second air suction port 7 of the drill driving device 3 via the respective air flow passages 2. The drill driving device 3 applies feed operations for causing the tool T to advance and retreat in the tool axis direction using air discharged from the air discharge ports 10 of the air control device 1 as power.

The air control system 11 of the air control device 1 has a function for discharging air from the air discharge ports 10 alternately for respective preset times. More specifically, the air control system 11 discharges air for advancing the tool (hereinafter referred to as "tool advancing air") and air for retracting the tool (hereinafter referred to as "tool retracting air") from the first air discharge port 10A and the second air discharge port 10B alternately for respective predetermined durations in accordance with step drilling conditions.

Step drilling is processing for drilling a hole by repeatedly causing the tool T to advance and retreat alternately. By performing step drilling, a deep hole having a favorable inner surface finish can be drilled while ensuring that chips are discharged favorably.

For this purpose, the air control system 11 may be provided with a time delay valve 12 as a timer for adjusting the times during which the air is discharged from the air discharge ports 10. The time delay valve 12 is a device that is caused to apply a delay to a transmission time of an air pressure signal by inputting air into a fixed-capacity container thereof through a variable throttle. In other words, at least either one of an advancement time and a retreat time of the tool T during step drilling can be adjusted variably using a knob for adjusting the variable throttle of the time delay valve 12.

Figure 2:
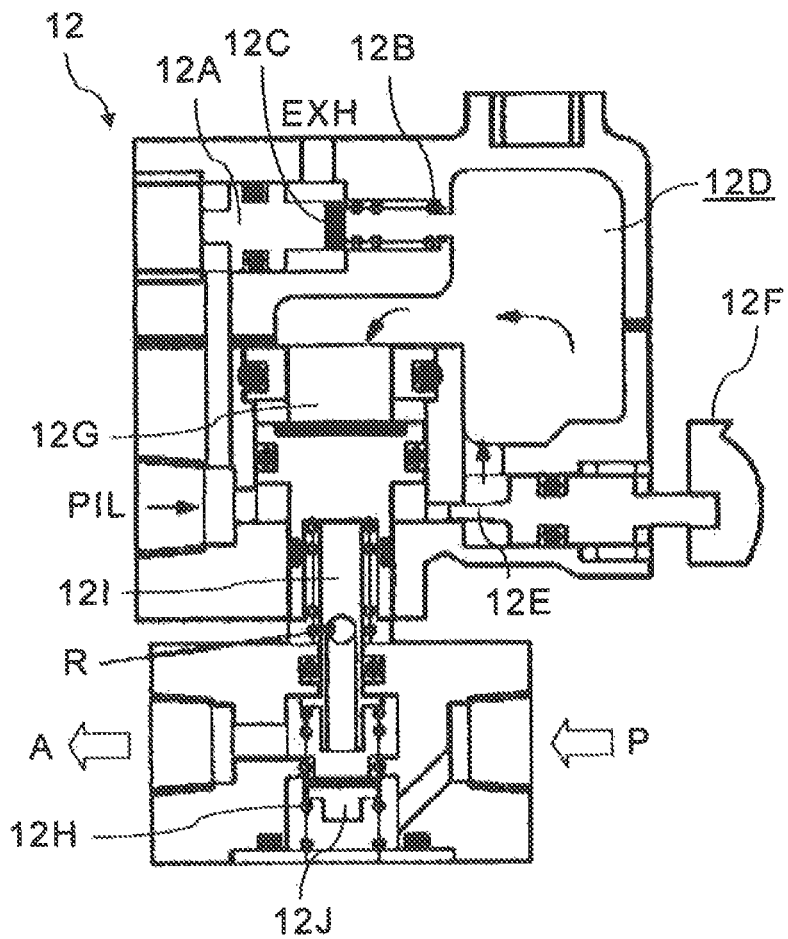
FIG. 2 is a sectional view showing the details of the structure of a time delay valve shown in FIG. 1.
Figure 3:
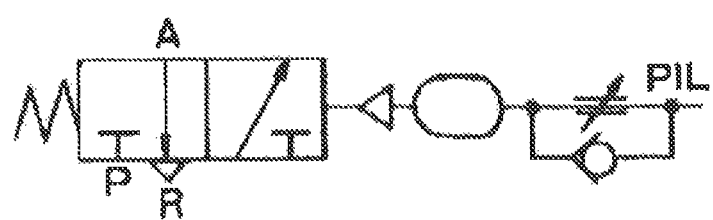
FIG. 3 is a view showing the time delay valve of FIG. 2 using Japanese Industrial Standards (JIS) symbols.

FIG. 2 is a sectional view showing the details of the structure of the time delay valve 12 shown in FIG. 1, and FIG. 3 is a view showing the time delay valve 12 of FIG. 2 using JIS symbols.

As shown in FIG. 2, when compressed air is input into the time delay valve 12 in the form of an input signal PIL, a piston 12A is pressed by the compressed air. As a result, a spring 12B is compressed, whereby a plug 12C is closed. Accordingly, the compressed air advances at a predetermined flow speed into a tank 12D of the time delay valve 12 through a gap formed by a needle 12E.

The width of the gap formed by the needle 12E can be adjusted using a knob 12F. Hence, the flow speed of the air flowing into the tank 12D can also be controlled variably.

When a pressure in the tank 12D increases, a spring 12H and a push rod 12I are pushed together with a piston 12G. As a result, a valve 12J opens, enabling air to flow from an inlet P to an outlet. A of the time delay valve 12.

Meanwhile, a backflow from the outlet A to the inlet P is prevented by a resistor R. Further, when the input signal PIL is OFF or the pressure in the tank 12D is high, the plug 120 is opened by the spring 12B. As a result, the air in the tank 12D is discharged from the time delay valve 12 in the form of an output signal EXH. Note that FIG. 2 shows a condition in which the valve 12J is closed such that the air flows into the tank 12D.

In the case where both the advancement time and the retreat time of the tool T are to be adjusted, both a time delay valve 12 for adjusting the advancement time of the tool T and a time delay valve 12 for adjusting the retreat time of the tool T are provided in the air control system 11. In FIG. 1, a knob of the time delay valve 12 for adjusting the advancement time of the tool T is used as a dial for adjusting the advancement time of the tool T, while a knob of the time delay valve 12 for adjusting the retreat time of the tool T is used as a dial for adjusting the retreat time of the tool T.

The knobs of the time delay valves 12 may be used as dials for adjusting an advancement distance and a retreat distance of the tool T. In this case, the advancement distance and retreat distance of the tool T may be determined in advance in accordance with the advancement time and retreat time of the tool T and respective flow speeds of the tool advancing air and tool retracting air, whereupon memories of the dials are tuned respectively in accordance with the advancement distance and the retreat distance of the tool T. Relationships between the advancement time and retreat time of the tool T and the advancement distance and retreat distance of the tool T can be determined easily by experiment. In this case, the knobs of the time delay valves 12 can be adjusted using feed amounts as the step drilling conditions.

The air control system 11 may be configured as desired as far as the air control functions described above are provided. An air operated valve, a regulator, and on the like may be used in addition to the time delay valves 12 as relay devices for processing the air pressure signal. The air operated valve opens and closes in response to an input of the air pressure signal. The regulator is a relay device for adjusting an air pressure of the air pressure signal.

The air control system 11 is preferably provided with an air speed controller for ensuring that air is introduced into the time delay valves 12 at an appropriate flow speed. By providing the speed controller in the air control system 11, the times can be adjusted more finely.

The compressed air supplied to the air suction ports 9 of the air control system 11 is supplied from a compressed air supply system 13. The compressed air can be supplied to the air control system 11 directly from the compressed air supply system 13, but may also be supplied indirectly.

As shown in FIG. 1, the typical pneumatic drill driving device 3 includes a compressed air supply port 14 through which the compressed air is supplied. Thus, an attachment 15 can be detachably attached to the drill driving device 3, the attachment 15 connecting an output side of the compressed air supply system 13 to the compressed air supply port 14 of the drill driving device 3, so as to take in the compressed air supplied via the compressed air supply port 14 from the drill driving device 3, and then supply the air again to the drill driving device 3.

As a result, the air control device 1 can be connected to the conventional pneumatic drill driving device 3. Further, when step drilling is not performed, the drill driving device 3 can be used without the air control device 1 by detaching the air control device 1 from the drill driving device 3.

Figure 4:
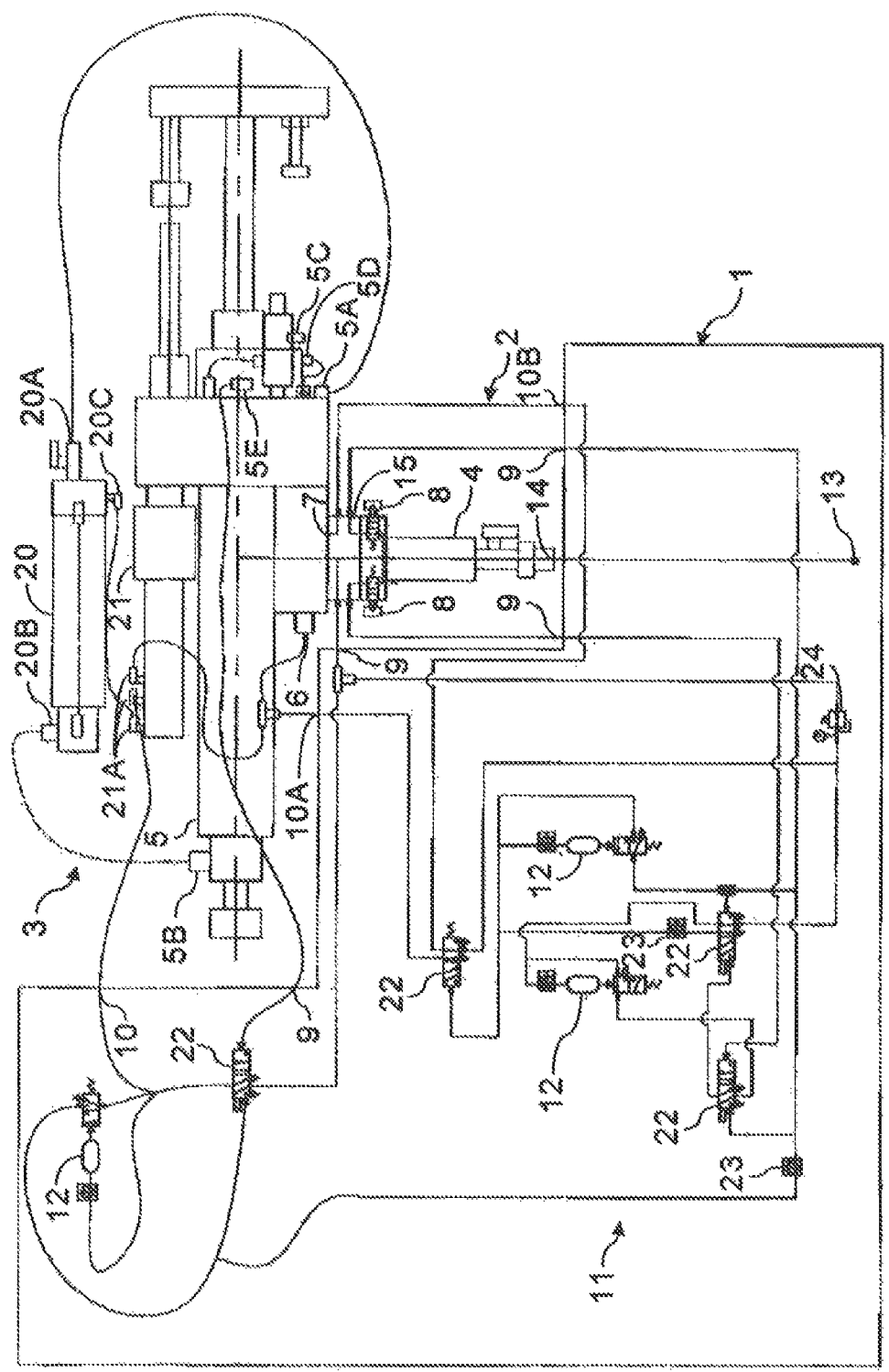
FIG. 4 is a view showing a specific configuration of the air control device and the drill driving device shown in FIG. 1.

FIG. 4 is a view showing a specific configuration of the air control device 1 and the drill driving device 3 shown in FIG. 1.

In FIG. 4, the air relay devices are illustrated using JIS symbols. Furthermore, compressed air flow passages are illustrated using solid lines, and cutting oil flow passages are illustrated using dot-dot-dash lines.

A cutting oil supply tank 20 is connected to the drill driving device 3 in FIG. 4 as an accessory in addition to the tool driver 5. Further, the tool driver 5 is provided with a hydraulic damper 21 as a device for controlling the feed speed of the tool T.

Cutting oil is stored in the cutting oil supply tank 20. The cutting oil is supplied to the tool driver 5 from the cutting oil supply tank 20 using compressed air supplied from the tool driver 5 as power. For this purpose, a compressed air supply port 20A is provided for the cutting oil supply tank 20. The air supply port 20A of the cutting oil supply tank 20 is connected to a compressed air discharge port 5A provided for the tool driver 5 via an air flow passage. Meanwhile, a cutting oil discharge port 20B is provided for the cutting oil supply tank 20. The cutting oil discharge port 20B of the cutting oil supply tank 20 is connected to a cutting oil supply port 5B provided for the tool driver 5 via a cutting oil flow passage.

Further, a compressed air supply port 20C is provided for the cutting oil supply tank 20. The compressed air supply port 20C of the cutting oil supply tank 20 is connected to one of compressed air supply ports 21A provided for the hydraulic damper 21 via an air flow passage. Compressed air discharged from the cutting oil supply tank 20 is used as power air for the hydraulic damper 21.

The air control system 11 can be formed by connecting the time delay valves 12, an air operated valve 22, a speed controller 23, and a regulator 24 via compressed air flow passages, as shown in the drawing. By connecting the various relay devices in the manner shown in FIG. 4, the air control system 11 can be made capable of alternately discharging the tool advancing air and the tool retracting air used in the step drilling.

In FIG. 4, the air control system 11 is connected to the compressed air supply port 21A of the hydraulic damper 21 via a compressed air flow passage. Thus, air for locking the hydraulic damper 21 and air for unlocking the hydraulic damper 21 is supplied to the hydraulic damper 21 from the air control system 11.

When a position of the tool T in a feed direction reaches a maximum stroke, a stop switch 5C of the tool driver 5 contacts a contact plate so as to be pressed thereby, and as a result, air is discharged through two discharge ports 5D and 5E. The air discharged from the discharge port 5D passes through a check valve so as to be supplied to the tool driver 5 as the tool retracting air. The air discharged from the other discharge port 5E is used as operating air for operating the air operated valve 22 of the air control system 11. More specifically, air for controlling the hydraulic damper 21 is supplied to the hydraulic damper 21 from the air control system 11 in response to an opening/closing operation of the air operated valve 22.

Figure 5:
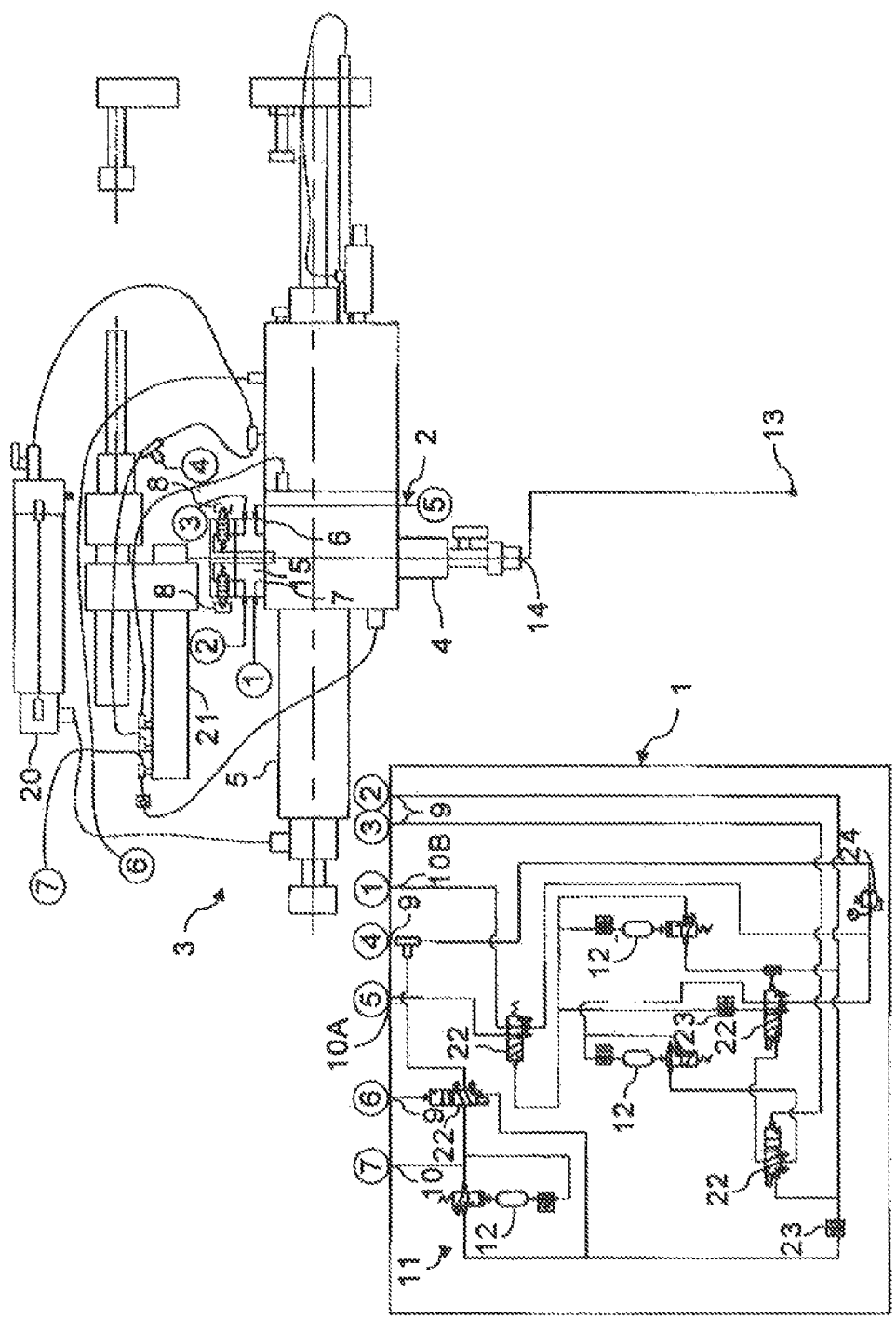
FIG. 5 is a view showing another specific configuration of the air control device and the drill driving device shown in FIG. 1.

FIG. 5 is a view showing another specific configuration of the air control device 1 and the drill driving device 3 shown in FIG. 1.

In the drill driving device 3 shown in FIG. 5, the ON and OFF switches 8 are disposed in an upper portion of the tool driver 5. Further, similarly to the drill driving device 3 shown in FIG. 4, the cutting oil supply tank 20 and the hydraulic damper 21 are provided for the drill driving device 3.

The drill driving device 3 shown in FIG. 5 is provided with air supply ports and discharge ports identified by numbers 1 to 7. The air supply ports and discharge ports of the drill driving device 3 identified by the respective numbers are respectively connected to the corresponding air discharge ports 10 10A and 10B and the air suction ports 9 of the air control device 1 via the air flow passages 2.

For the drill driving device 3 thus configured, the air control device 1 can be constructed by disposing the time delay valves 12, the air operated valve 22, the speed controller 23, and the regulator 24 appropriately, as shown in FIG. 5.

As shown in FIGS. 4 and 5, the air control device 1 may be constructed in accordance with a pipe configuration of an air control system provided in the drill driving device 3.

(Operations and Actions)

Next, operations and actions of the air control device 1 will be described.

First, the dials of the time delay valves 12 are tuned in advance in accordance with respective supply times of the tool advancing air and the tool retracting air in accordance with the step drilling conditions. Compressed air is then supplied from the compressed air supply system 13. As a result, air is taken into the air control device 1, whereupon the air control device 1 enters standby. Meanwhile, air is also supplied to the cutting oil supply tank 20 and the hydraulic damper 21 of the drill driving device 3, whereupon the drill driving device 3 enters standby.

Next, when the ON switch is pressed, air flows into a flow passage that is opened by pressing the ON switch. Accordingly, the tool advancing air is supplied from the first air discharge port 10A of the air control device 1 to the first air suction port 6 of the drill driving device 3. Further, operating air is supplied to the hydraulic damper 21. As a result, the tool T is caused to advance by the tool driver 5.

Following the elapse of the advancement time of the tool T, which is set as a step drilling condition, the flow passages in the air control device 1 are varied by opening and closing the time delay valves 12. Accordingly, the tool retracting air is supplied from the second air discharge port 10B of the air control device 1 to the second air suction port 7 of the drill driving device 3. As a result, the tool T is caused to retreat by the tool driver 5.

Following the elapse of the retreat time of the tool T, which is set as a step drilling condition, the flow passages in the air control device 1 are varied by opening and closing the time delay valves 12. Accordingly, the tool advancing air is supplied from the first air discharge port 10A of the air control device 1 to the first air suction port 6 of the drill driving device 3 again. As a result, the tool T is caused to advance again by the tool driver 5.

By opening and closing the time delay valves 12 similarly thereafter, the tool T is repeatedly caused to advance and retreat alternately. In other words, air is discharged into the drill driving device 3 alternately through the air discharge ports 10 of the air control device 1 for the respectively preset times.

In step drilling, the advancement time is set to be longer than the retreat time. Therefore, the position of the tool T gradually approaches the maximum stroke. When the position of the tool T reaches the maximum stroke, the stop switch 5C of the tool driver 5 contacts the contact plate so as to be pressed thereby. As a result, the air flow passages in the drill driving device 3 and the air control device 1 are varied such that the drill driving device 3 and the air control device 1 return to their respective initial conditions and then enter standby again. When the stop switch 8 is pressed by a manual operation, the air flow passages in the drill driving device 3 and the air control device 1 are likewise varied such that the drill driving device 3 and the air control device 1 return to their respective initial conditions and then enter standby again.

Hence, with the air control device 1 described above, a hole can be step-drilled by supplying air intermittently to the handheld drill driving device 3. In other words, the air control device 1 is an air pressure signal control device that outputs suctioned air to the drill driving device 3 along a plurality of paths in a time-divided fashion. The air control device 1 also performs air pressure signal control using the time delay valves 12 so that the period in which air is supplied to the drill driving device 3 can be adjusted.

(Effects)

According to the air control device 1, chips can be favorably discharged to the outside of a hole during drilling work, and therefore chip clogging can be avoided. As a result, an increase in an operation time due to chip clogging can be avoided, thereby enabling an improvement in drilling efficiency. In addition, a quality of the hole can be improved. This is particularly effective when drilling a deep hole.

During conventional step drilling, a user must switch the drill driving device 3 ON and OFF manually. By using the air control device 1, on the other hand, a hole can be step-drilled automatically by supplying compressed air that flows in a single direction. A step drilling operation can therefore be performed easily. Further, by using the time delay valves 12 as timers, step amounts of the step drilling can be adjusted variably. As a result, step drilling can be performed under conditions corresponding to the hole depth.

Moreover, the air control device 1 uses an air pressure signal as a control signal. Hence, an electrical system is not required as the power source of the air control device 1, and therefore the air control device can be used on various sites.

The present invention is not limited to the above-described example. The novel method and device described herein may be realized in various other examples. Further, various omissions, replacements, and modifications may be applied to the example of the method and device described herein within a scope that does not depart from the spirit of the invention. The attached claims and their equivalents are encompassed by the scope and spirit of the invention, and therefore include these various examples and modifications applied thereto.

The invention claimed is:

1. An air control device for a drilling tool comprising:
   an air suction port to take in air;
   air discharge ports to discharge the taken-in air; and
   an air control system to discharge the air through the air discharge ports alternately for respective preset durations of time, wherein
   the discharge ports comprise a first air discharge port for communicating with a first flow passage for advancing the drilling tool, and a second air discharge port for communicating with a second air flow passage for retracting the drilling tool, and the air control system alternates between discharging the air to the first air discharge port for advancing the tool and discharging the air to the second air discharge port for retracting the tool, with the respective durations of time for discharging being preset to cause the drilling tool to perform a step drilling operation.

2. The air control device according to claim 1, wherein the air control system is provided with a time delay valve as a timer for adjusting the preset durations of time for discharging.

3. The air control device according to claim 2, wherein the air control system is provided with an air speed controller for controlling the speed at which the air is introduced into the time delay valve.

4. The air control device according to claim 3, wherein the first and second air flow passages are provided in a drill driving device of the drilling tool.

5. The air control device according to claim 4, wherein the drill driving device applies feed operations for causing the drilling tool to advance and retreat in a tool axis direction by using the air discharged from the air discharge ports as power.

6. The air control device according to claim 2, wherein the first and second air flow passages are provided in a drill driving device of the drilling tool.

7. The air control device according to claim 6, wherein the drill driving device applies feed operations for causing the drilling tool to advance and retreat in a tool axis direction by using the air discharged from the air discharge ports as power.

8. The air control device according to claim 1, wherein the first and second air flow passages are provided in a drill driving device of the drilling tool.

9. The air control device according to claim 8, wherein the drill driving device applies feed operations for causing the drilling tool to advance and retreat in a tool axis direction by using the air discharged from the air discharge ports as power.

10. An air control method for driving a drilling tool comprising:
utilizing the air control device accord to claim 1 to:
take in air; and
discharge the taken-in air alternately through the air discharge ports for the respective preset durations of time.

11. The air control device according to claim 1, wherein the respective durations of time for discharging air are preset to cause the drilling tool to perform a step drilling operation wherein the drilling tool is caused to advance at least twice and retreat at least once before reaching a maximum stroke for drilling a hole.

12. The air control device according to claim 1, wherein the preset duration of time for discharging air from the first air discharge port is greater than the preset duration of time for discharging air from the second air discharge port.

13. The air control device according to claim 1, wherein the air control device is releasably attachable to the drilling tool.

14. The air control device according to claim 1, wherein the air suction port takes in air from a compressed air supply.

* * * * *